(No Model.)
C. JUNKER.
ROTARY SHUTTLE FOR SEWING MACHINES.
No. 341,333. Patented May 4, 1886.
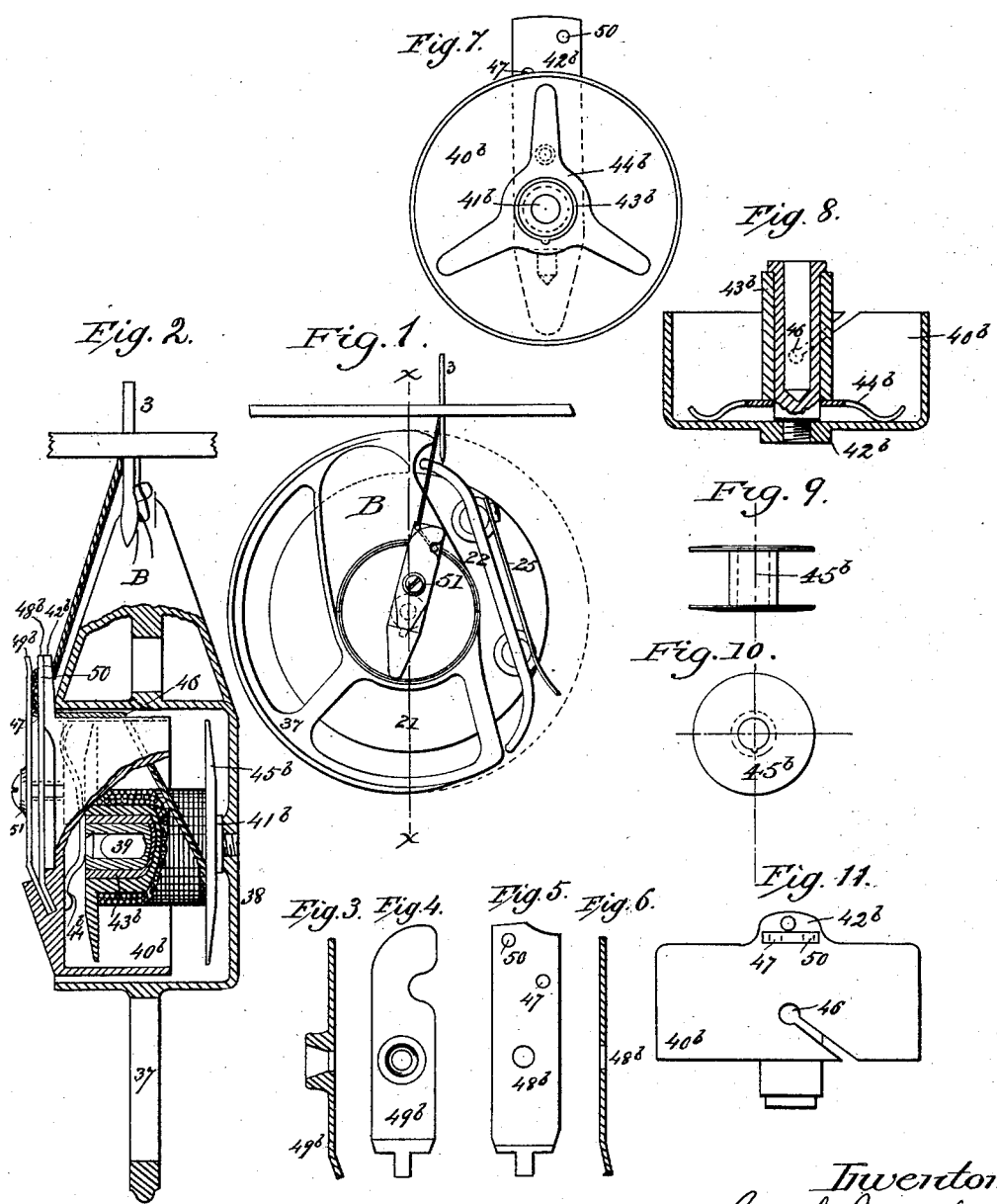
Witnesses:
W. W. Hollingsworth
Inventor:
Carl Junker
By Munn & Co.
Attorneys

UNITED STATES PATENT OFFICE.

CARL JUNKER, OF CARLSRUHE, GERMANY, ASSIGNOR TO JUNKER & RUH, OF SAME PLACE.

ROTARY SHUTTLE FOR SEWING-MACHINES.

SPECIFICATION forming part of Letters Patent No. 341,333, dated May 4, 1886.

Application filed August 3, 1885. Serial No. 173,401. (No model.)

*To all whom it may concern:*

Be it known that I, CARL JUNKER, a citizen of Germany, and resident at Carlsruhe, Germany, have invented new and useful Improvements in Rotary Shuttles for Sewing-Machines, of which the following is a specification.

This invention relates to improvements in sewing-machines patented to me by Letters Patent of the United States of America, dated March 20, 1883, No. 274,381.

Reference is to be had to the accompanying drawings, forming part of this specification, wherein the same letters are applied to the same parts in all the figures.

Figure 1 is a side view of my invention as applied for use. Fig. 2 is a sectional view thereof on the line $x\ x$ of Fig. 1, and Figs. 3 to 11 are detail views of my invention.

In the shuttle B the axes of the spool and shuttle coincide. The case 38 of the shuttle 37 contains a pin, 39, on which is placed the spool-case $40^b$, which holds the spool. The spool-case $40^b$ has a hollow pin, $41^b$, and a tension device, $42^b$. Upon the hollow pin $41^b$ is placed the tube $43^b$, which is furnished with springs $44^b$ and carries the spool $45^b$. The hole of the spool has a small groove in it, in which a lug on the tube $43^b$ is received, and the rotation of the spool is made steady by the action of the springs. From the spool $45^b$ the thread passes through the hole 46 of the case $40^b$, the hole 47 of the tension-plate $42^b$, between the springs $48^b$ and $49^b$, and through the hole 50. The regulation of the tension is effected by means of the screw 51, which connects the two springs $48^b$ and $49^b$. No further arrangement is required for holding the spool in the case 38.

I claim—

A uniformly vertically-rotating shuttle, B, of semicircular shape, held by the driver, the axes of the spool and shuttle being coincident, the shuttle consisting of the parts 37, 38, 39, $40^b$, $41^b$, $42^b$, $43^b$, $44^b$, $45^b$, $48^b$, $49^b$, and 51 and the holes for the tension of the thread, all substantially as herein described and shown.

In testimony whereof I have signed my name to this specification in the presence of two subscribing witnesses.

CARL JUNKER.

Witnesses:
 FRANZ HASSLACHER,
 JOSEPH PATRICK.